US012626505B2

(12) United States Patent
Beckman et al.

(10) Patent No.: US 12,626,505 B2
(45) Date of Patent: May 12, 2026

(54) COMPUTER IMPLEMENTED METHOD FOR ATTRIBUTION OF LAND USE/LAND COVER, A TOOL FOR BUILDING A TRANSPORT NETWORK MAP AND A NAVIGATION DEVICE

(71) Applicant: VANTOR SWEDEN AB, Linköping (SE)

(72) Inventors: Thomas Beckman, Linköping (SE); Gustav Tapper, Linköping (SE)

(73) Assignee: VANTOR SWEDEN AB, Linkoping (SE)

( * ) Notice: Subject to any disclaimer, the term of this patent is extended or adjusted under 35 U.S.C. 154(b) by 485 days.

(21) Appl. No.: 18/067,648

(22) Filed: Dec. 16, 2022

(65) Prior Publication Data

US 2024/0144668 A1     May 2, 2024

(30) Foreign Application Priority Data

Nov. 1, 2022     (EP) .................................... 22204915

(51) Int. Cl.
*G06V 20/13*          (2022.01)
*G06T 7/246*          (2017.01)
*G06T 7/73*           (2017.01)

(52) U.S. Cl.
CPC .............. *G06V 20/13* (2022.01); *G06T 7/248* (2017.01); *G06T 7/74* (2017.01);
(Continued)

(58) Field of Classification Search
None
See application file for complete search history.

(56) References Cited

U.S. PATENT DOCUMENTS 11,386,650 B2 *  7/2022  Yadav ................... G06V 10/20
2021/0150206 A1  5/2021  Bader
(Continued)

FOREIGN PATENT DOCUMENTS

CN        102855759 A     1/2013
EP          3035237 A1     6/2016

OTHER PUBLICATIONS

B. Salehi, Y. Zhang and M. Zhong, "Automatic Moving Vehicles Information Extraction From Single-Pass WorldView-2 Imagery," in IEEE Journal of Selected Topics in Applied Earth Observations and Remote Sensing, vol. 5, No. 1, pp. 135-145, Feb. 2012, doi: 10.1109/JSTARS.2012.2183117. (Year: 2012).*
(Continued)

*Primary Examiner* — Andrew M Moyer
*Assistant Examiner* — Caroline E. Depalma
(74) *Attorney, Agent, or Firm* — Harness, Dickey & Pierce, P.L.C.

(57)          ABSTRACT

The present disclosure relates to a computer implemented method (100) for attribution of Land Use/Land Cover, LULC, said method comprising the steps of: providing (S1) a plurality of images covering a transport network part, identifying (S2) objects in at least a subset of said plurality of images, identifying (S4) transport routes at least in said at least one satellite image of the plurality of images, and determining (S5) characteristics of said transport network part based on the identified objects at said identified (S4) transport routes.

12 Claims, 4 Drawing Sheets

(52) U.S. Cl.
CPC .............. *G06T 2207/10032* (2013.01); *G06T 2207/30181* (2013.01); *G06T 2207/30242* (2013.01); *G06V 2201/08* (2022.01)

(56) References Cited

U.S. PATENT DOCUMENTS

2021/0164787 A1* 6/2021 Soni ..................... G01C 21/32
2022/0383024 A1* 12/2022 Yadav .................. G06V 10/421

OTHER PUBLICATIONS

European Search Report issued in application No. EP 22204915.7 mailed Mar. 22, 2023 (9 pages).
Bahram, Salehi et al. "Automatic Moving Vehicles Information Extraction From Single-Pass WorldView-2 Imagery"; IEEE Journal of Selected Topics in Applied Earth Observations and Remote Sensing, IEEE, USA, vol. 5, No. 1, Feb. 2012 (11 pages).
Van Winden, Karl et al. "Automatic Update of Road Attributes by Mining GPS Tracks", Transactions in GIS, vol. 20, No. 5, (Jan. 25, 2016) pp. 664-683, XP093031635 (20 pages).
Marchesi, Andrea et al. "Detection of Moving Vehicles with Worldview-2 Satellite Data", The 33rd Asian Conference on Remote Sensing; (Nov. 26, 2012) XP093031461 (9 pages).
Sunar, F. "An analysis of changes in a multi-date data set: a case study in the Ikitelli area, Istanbul, Turkey." Int. J. Remote Sensing, 1998, vol. 19, No. 2, 225-235.

* cited by examiner

200

Processor — 201

Memory — 202

Communication interface — 203

300

Processor — 301

Memory — 302

User input interface — 303

Display — 304

400

410 — Red Band detector

411 — Green Band detector

412 — Blue Band detector

413 — Pan-chromatic Band detector

Detector sweep direction

500

520

521

522

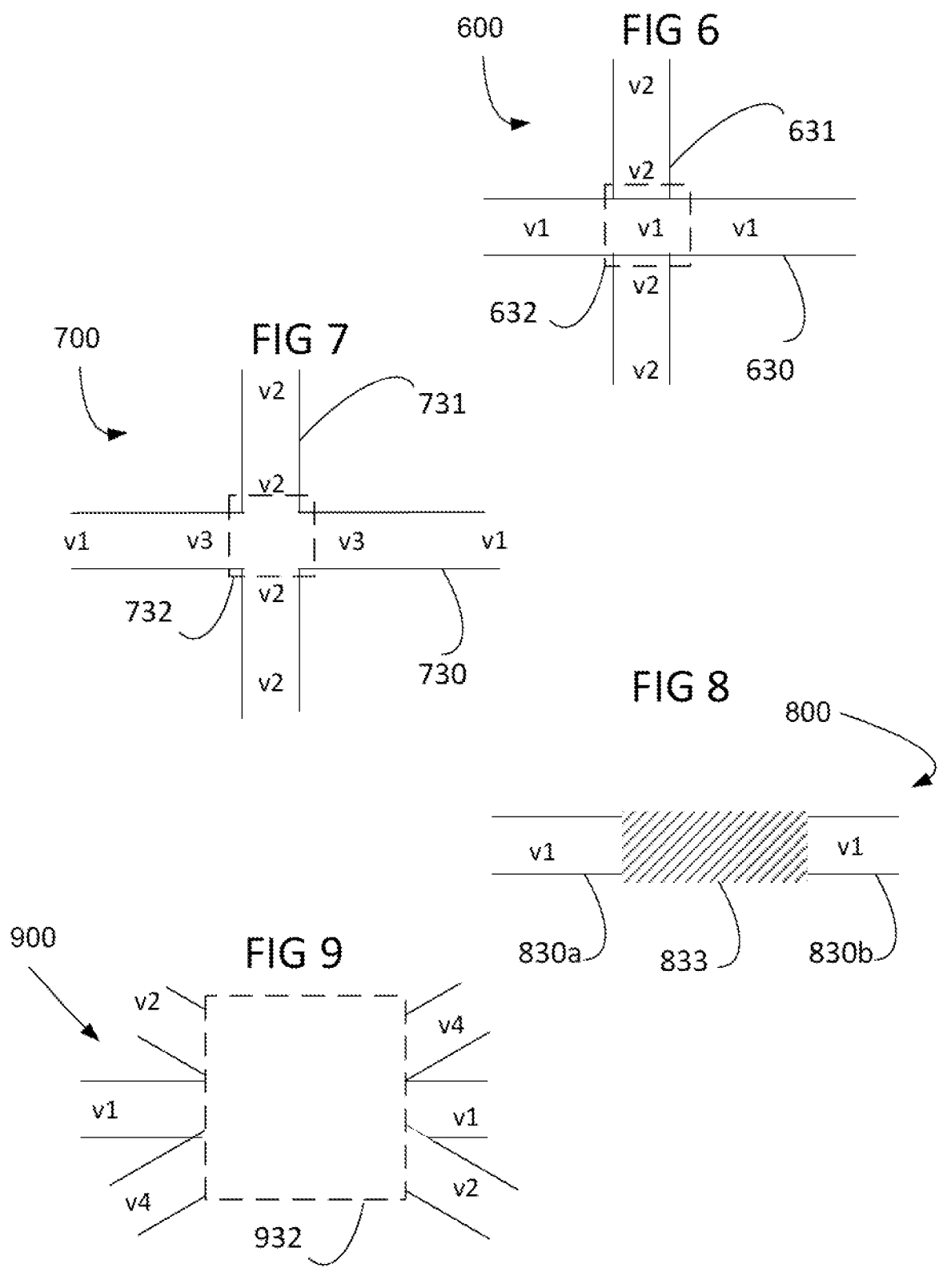

COMPUTER IMPLEMENTED METHOD FOR ATTRIBUTION OF LAND USE/LAND COVER, A TOOL FOR BUILDING A TRANSPORT NETWORK MAP AND A NAVIGATION DEVICE

This application claims benefit of European Application No. 22204915.7, filed Nov. 1, 2022, which application is incorporated herein by reference. To the extent appropriate, a claim of priority is made to the above disclosed application.

TECHNICAL FIELD

The present disclosure relates to a computer-implemented method for attribution of land use/land cover, a tool for building a transport network map and a navigation device. More specifically, the disclosure relates to a computer-implemented method for attribution of land use/land cover, a tool for building a transport network map and a navigation device as defined in the introductory parts of the independent claims.

BACKGROUND ART

A fast growing market both in civilian and military business is geographical information systems. Knowledge about geographical conditions forms a fundamental decision support to companies, authorities and in the military. The geographical information can comprise digital maps having superposed information layers such as infrastructure, terrain type and different types of objects.

A concept used in this regard is Land Use/Land Cover, LULC, classification or attribution. LULC, classification refers to categorization or classification of human activities and natural elements on the landscape within a specific time frame based on established scientific and statistical methods of analysis of appropriate source materials.

Another type of known classification is described in EP3035237 A1. This document relates to classification of terrain type using a plurality of overlapping aerial images.

SUMMARY OF THE INVENTION

An object of the invention is to obtain more information from LULC attribution.

According to a first aspect there is provided a computer implemented method for attribution of Land Use/Land Cover, LULC, the method comprising the steps of: providing a plurality of co-registered images comprising at least one satellite image, said co-registered images covering a transport network part, identifying objects in at least a subset of the plurality of images, identifying transport routes, such as roads or railways or water based transport routes, at least in said at least one satellite image of the plurality of images, and determining characteristics of the transport network part based on the identified objects.

Thus, the method allows for combination of the technology of attribution of Land Use/Land Cover, LULC, with transport network information to determine characteristics of the transport network part.

In particular new satellite images may be obtained often, for example on a daily basis or more frequently or less frequently depending on the orbital characteristics of the satellite(s) or number of satellites. It is thereby possible to provide an up-to-date determination of the characteristics of the transport network part. Thus, at least the steps of identifying objects in at least a subset of the plurality of images and determining characteristics of the transport network part based on the identified objects can be updated frequently, while the step of identifying transport routes, such as roads or railways or water-based transport routes, at least in said at least one satellite image of the plurality of images can be made once or be updated less frequently.

Characteristically, the identified objects are vehicles. The vehicles may be land-based vehicles such as cars and/or trains and/or marine vehicles such as ships. The marine vehicles are characteristically vehicles operating on the sea/lake/river surface.

According to some embodiments, the determination of the characteristics of said transport network part being based on a count of the identified objects at the respective identified transport route.

The count of, for example, vehicles present along a road is a good measure of the characteristics of the road. If the obtained images are from different times of the day, even further characteristics can be found as the variation of number of vehicles during a day and/or the count or variation for different days of the week and/or the count or variation for different seasons may be provided.

According to some embodiments, the determination of characteristics of said transport network part comprises determining the characteristics for each identified transport route.

According to some embodiments, the determination of the characteristics of the transport network part comprises determining a number of parallel lanes or tracks in each identified transport route based on the locations of the objects on the transport route in a direction across the extension of the transport route.

As is clear from the above it may be possible to determine of the number of parallel lanes or tracks only based on the positions of identified objects in the transport route in a direction across the extension of the transport route. It is not necessary to use other information even if of course complementary information obtainable from the images can be used, such as road width and/or road markings and/or railing along the road.

According to some embodiments, at least some of the images used for identification of objects are obtained using at least one first sensor and at least one second sensor, wherein there is a time difference between image capture using the first and second sensors. For example, the at least one first sensor having a first wavelength characteristic and at least one second sensor having a second wavelength characteristic, said second wavelength characteristic being different than the first wavelength characteristic.

Identification of a moving object can then be made using knowledge of the presence of the time difference and detection of displacements in the image captured by the at least one first sensor in relation to the image captured by the at least one second sensor. It may for example be of interest to take a separate count of moving objects and stationary objects for use in the determination of the characteristics of the transport network part.

According to some embodiments, the computer-implemented method comprises determining an orientation of the respective moving object based on the detected displacements. Thereby, the characteristics of said transport network part can be determined based on the determined orientation of the moving objects.

For example, the determined orientation can be used for determining transport network part characteristics such as whether a road is a two-way road or a single-way road and/or a transport direction for each identified lane/track can be determined. It may even be identified that the transport direction of a road or an individual lane of the road is changing over time. For example, it may be determined that a road has a certain number of lanes, such as five, wherein a determined part of the lanes, for example three lanes, are used for traffic in the direction towards a city center during morning while fewer lanes, for example two lanes, are used in this direction during afternoon.

According to some embodiments, the time difference between capture using the at least one first sensor and the at least one second sensor is known, and the method further comprises determining a velocity of the respective identified moving object using the known time difference and the size of the displacements in the image captured by the at least one first sensor in relation to the image captured by the at least one second sensor.

Thus, the determination of the characteristics of said transport network part can be based on the determined velocity.

The characteristics for each identified transport route may be determined based on the determined velocity at different portions of the plurality of images.

For example, when a single road/track/water-based transport route has been identified, it can from the plurality of satellite images be determined whether the velocity of the moving objects is different at different location along the road/track and accordingly, if it is likely that there are different speed limits at those locations along the track.

If there are a plurality of roads/tracks/water-based transport routes this determination of different velocity and accordingly potentially different speed limits may be made for at least some of the identified roads/tracks/water-based transport routes.

When the plurality of images each cover the same transport network part, the satellite images are co-registered.

According to some embodiments, the providing of a plurality of images comprises providing a plurality of images for a plurality of transport network parts, and wherein characteristics are determined for each transport network part.

Thus, in this way transport network map can be built.

According to some embodiments, the determination of characteristics of said transport network part comprises determining the characteristics for each identified transport route. When there are a plurality of transport routes and when the respective transport route is not distinguishable from the obtained satellites images along a part of its extension for example due to at least one tunnel and/or at least one viaduct and/or at least one level crossing and/or at least one intersection and/or at least one object in the satellite images obscuring at least a part of at one of the transport routes, the method comprises refining the identification of transport routes to resolve the not distinguishable road part/railway part/water based transport route part based on the determined characteristics of said transport network part.

In this way, information is provided which goes far beyond what is characteristically obtainable from images such as satellite images. Characteristics of complex network parts can be determined using orientation and velocity information for parts where the transport routes are identifiable and resolving those parts where the transport routes cannot be otherwise resolved using interpolation.

Alternatively, the refinement may comprise using the result of the performed object identification to strengthen or change the transport route identification.

According to some embodiments, at least some of the obtained images are geo-referenced. This means that the obtained images are each associated to coordinate data in a common coordinate system, wherein 2D positions on the ground can be given as latitude and longitude or equivalents thereof. The coordinate data may be two-dimensional or three-dimensional. Alternatively, the images are associated to a three-dimensional coordinate and a pointing direction of the imaging device at capture of the respective image.

According to a second aspect there is provided a tool for building a transport network map, the tool comprising a processor arranged to perform the method as described above. The coordinates of this transport network map are characteristically geo-referenced, i.e. 2D positions are given as latitude and longitude or the like. The coordinates of the transport network map may be two-dimensional or three-dimensional.

According to a third aspect there is provided a navigation device comprising a memory storing a transport network map at least partly provided using the method as described above.

Effects and features of the second and third aspects are to a large extent analogous to those described above in connection with the first aspect. Embodiments mentioned in relation to the first aspect are largely compatible with the second and third aspects.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

The term Land Use/Land Cover, LULC, classification or attribution is to be interpreted as categorization or classification of human activities and natural elements on the landscape within a specific time frame based on established scientific and statistical methods of analysis of appropriate source materials.

BRIEF DESCRIPTION OF THE DRAWINGS

The above objects, as well as additional objects, features and advantages of the present disclosure, will be more fully appreciated by reference to the following illustrative and non-limiting detailed description of examples according to the present disclosure, when taken in conjunction with the accompanying drawings.

FIG. 6 is a schematic illustration of a first example of a section of a transport network part.

FIG. 7 is a schematic illustration of a second example of a section of a transport network part.

FIG. 8 is a schematic illustration of a third example of a section of a transport network part.

FIG. 9 is a schematic illustration of a fourth example of a section of a transport network part.

DETAILED DESCRIPTION

The present disclosure will now be described with reference to the accompanying drawings, in which preferred example embodiments of the disclosure are shown. The disclosure may, however, be embodied in other forms and should not be construed as limited to the herein disclosed examples. The disclosed examples are provided to fully convey the scope of the disclosure to the skilled person.

Figure 1:
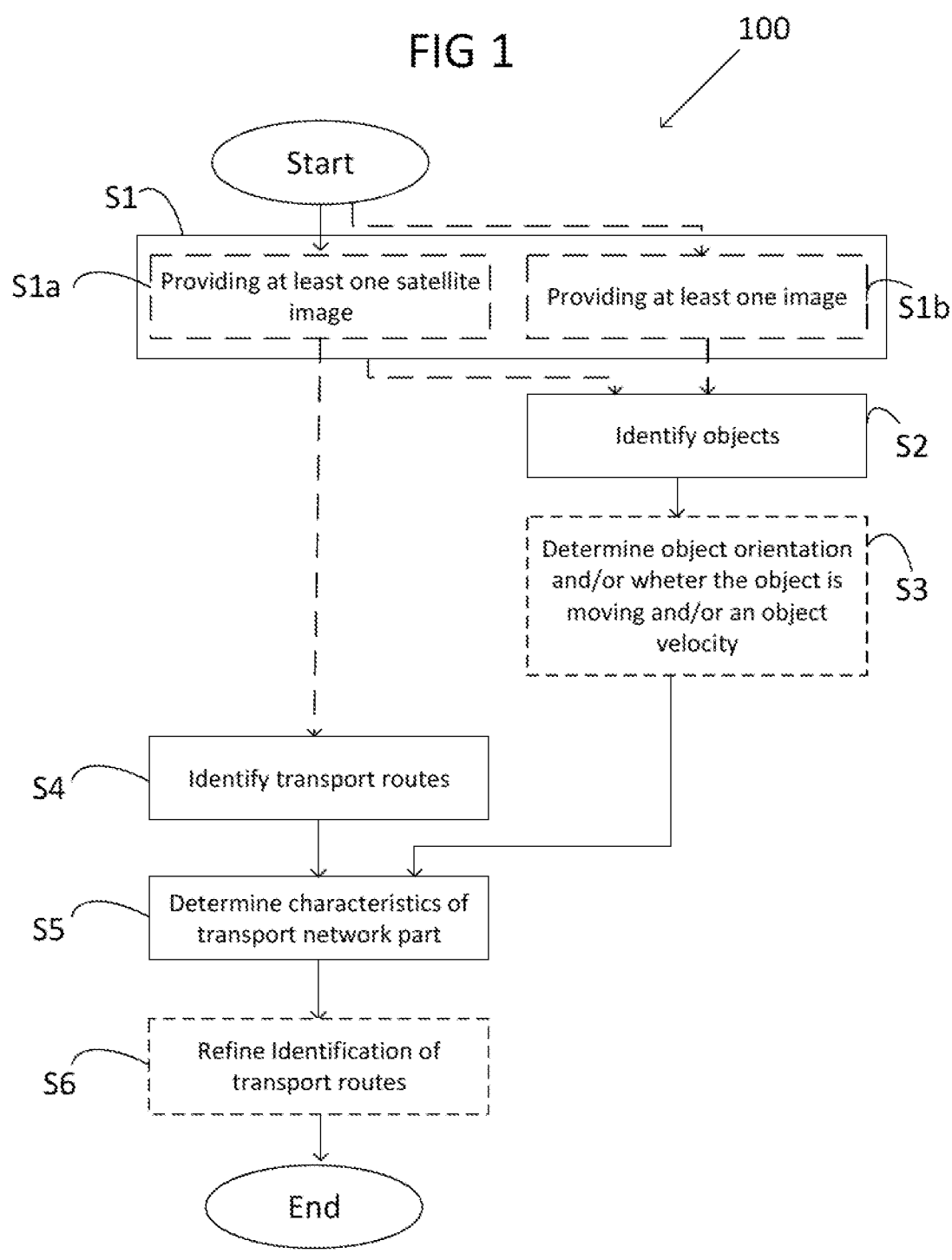
FIG. 1 is a flow chart illustrating an example of a computer-implemented method for attribution of Land Use/ Land Cover, LULC.

FIG. 1 shows an example of a computer implemented method 100 for attribution of Land Use/Land Cover, LULC. The method 100 may be implemented in a tool for building a transport network map.

The method 100 comprises a step of providing S1 a plurality of images comprising at least one satellite image, said plurality of satellite images covering a transport network part. The satellite image(s) may be obtained for example from a satellite image library storing satellite images.

In embodiments, the provided plurality of images may comprise images captured from other platforms, such as airborne platforms like aircrafts, UAVs etc.

Apart from the plurality of images, conflation with other sources, such as OpenStreet Map, is also possible, said sources providing information identifying and/or describing characteristics of roads or railways or water based support routes.

The plurality of images are preferably geo-referenced. This means that the obtained satellite images are each associated to coordinate data in a common coordinate system, wherein 2D positions on the ground are given as latitude and longitude or equivalents thereof. The coordinate data may be two-dimensional or three-dimensional. Alternatively, the images are associated to a three-dimensional coordinate and a pointing direction of the imaging device at capture of the respective image.

The plurality of images each covering the same transport network part are preferably co-registered. Image co-registration is performed when the intention is to study two or more images in a series, typically to understand change between the images of the series.

The images may come from the same or from different sensors. The images may have the same or different spatial resolutions. Co-registration is made to ensure that the images become spatially aligned so that any feature in one image overlaps as well as possible its footprint in any other image in the series. The concept of co-registration of images is known to a person skilled in the art and will not be described more in detail herein.

At least some of the images, for example satellite images, may have been obtained using an image capturing device comprising at least one first sensor and at least one second sensor, wherein there is a time difference between capture using the at least one first sensor and the at least one second sensor. For example, the at least one first sensor has a first wavelength characteristic and the at least one second sensor has a second wavelength characteristic, said second wavelength characteristic being different than the first wavelength characteristic. Accordingly, when using this type of image capturing device, there is a time difference between capture using the first and second sensors. The effect of this is substantially none when objects in the image are stationary. However, when the objects captured by the image capturing device are in movement, this will be apparent from the image as the objects in movement captured by the first and second sensors will be displayed in slightly displaced locations in the image.

The plurality of images may comprise a plurality of images for a plurality of transport network parts.

The computer-implemented method 100 further comprises a step of identifying S2 objects in at least a subset of the plurality of images.

The identification of objects may be made using any known method in the art. For example object recognition in the images can be used. Accordingly, objects having known characteristics, such as vehicles, are identified in the image, for example from a-priori knowledge about visual characteristics of the vehicles as seen from a satellite.

The identification S2 of a moving object can be made using knowledge of the presence of the time difference as discussed in relation to the image capturing device having the at least one first sensor and the at least one second sensor, to detect displacements in the image of objects captured by the first and second sensors. When such displacement can be detected in the image such as a satellite image, this is an indication that the displacement relates to a moving object in the form of a vehicle.

The objects may be land-based vehicles such as cars and/or trains and/or marine vehicles such as ships.

The two object identification examples given above can be used together or one of them can be used. These examples are only examples. Other ways of providing object identification in the images within the knowledge of the person skilled in the art, can also be used.

When displacements in the image have been detected between capture using the at least one first sensor and capture using the at least one second sensor, the computer-implemented method 100 may further comprise determining S3 an orientation of the respective moving object based on the detected displacements.

When a time difference between capture using at least one first sensor and at least one second sensor is known, the computer-implemented method 100 may further comprise determining S3 a velocity of the respective identified moving object using the known time difference and the size of the displacements in the image caused by the time difference in capture using the at least one first sensor and capture using the at least one second sensor.

The computer-implemented comprises further identifying S4 transport routes in said at least one satellite image of the plurality of images and determining S5 characteristics of said transport network part based on said identified transport route(s).

The transport routes comprise for example roads and/or railways and/or water-based transport routes. The identification of a transport route comprises characteristically both an identification of the presence of a transport route and an identification of which type of transport route the identified transport route is, for example a road, railway or water-based transport route.

Thus, the method allows for combination of the technology of attribution of Land Use/Land Cover, LULC, with transport network information to determine characteristics of the transport network part.

The same set of provided S1 images can be used both for the step S2 of identifying objects on one hand and the step S4 of identifying transport routes on the other hand. However, alternatively, different images, or partly different images, can be used for the step S2 of identifying objects on one hand (the images obtained in step S1*b* are used) and the step S4 of identifying transport routes on the other hand (the images obtained in step S1*a* are used).

In particular new satellite images may be obtained often, for example on a daily basis. It is thereby possible to provide an up-to-date determination of the characteristics of the transport network part. Thus, at least the steps S2 of identifying objects in at least a subset of the plurality of images and determining characteristics of the transport network part based on the identified objects can be updated frequently, while the step of identifying S4 transport routes at least in said at least one satellite image of the plurality of images can be made once or be updated less frequently.

The computer-implemented method 100 comprises in an example identifying S4 transport routes in said at least one satellite image based on the locations in the image of said identified objects.

The determination S5 of the characteristics of said transport network part is in an example based on a count of the identified objects in each one of the at least one image used for object identification.

When the computer-implemented method 100 comprises identifying S4 transport routes in the at least one image used for transport route identification based on the locations in the images used for object identification of said identified objects, the determination S5 of characteristics of said transport network part may comprise determining the characteristics for each identified transport route.

The determination S5 of the characteristics of the transport network part comprises in an example determining a number of parallel lanes or tracks in in each identified S4 road or railway or water based transport route based on the locations of the objects on the road or railway or water based transport route in a direction across the extension of the transport route.

When an orientation of the respective moving object has been determined S3, the characteristics of said transport network part may be determined S5 based on the determined orientation of the moving objects.

When a velocity of the respective identified moving object has been determining S3, the determination S5 of the characteristics of said transport network part is in an example based on the determined velocity. Further, the characteristics for each identified transport route can be determined based on the determined velocity at different portions of the plurality of images.

When a plurality of satellite images has been provided comprising a plurality of satellite images for a plurality of transport network parts, the characteristics are in an example determined for each transport network part.

When the computer-implemented method 100 comprises identifying S4 transport routes in the at least one image used for transport route identification based on the locations in the images used for object identification of said identified objects, the determination S5 of characteristics of said transport network part may comprise determining the characteristics for each identified transport route. The determination S5 of characteristics of said transport network part may comprise determining the characteristics for each identified transport route such as road and/or railway and/or water based transport route, wherein when there are a plurality of roads and/or railways and/or water based transport routes and when the respective road/railways/water based transport route is not distinguishable from the obtained satellites images along a part of its extension for example due to at least one tunnel and/or at least one viaduct and/or at least one level crossing and/or at least one intersection and/or at least one object in the satellite images obscuring at least a part of at one of the roads/railways/water based transport routes, the method 100 comprises refining S6 the identification of road/railways/water based transport routes to resolve the not distinguishable road parts/railway parts/water based transport route parts based on the determined characteristics of said transport network part.

However, the refining S6 of the identification of road/railways/water-based transport routes may also or instead be made to strengthen an identification or change an identification of a transport route as for example a road or railway or water-based transport route. In this example, the refinement comprises using the result of the performed object identification to strengthen or change the transport route identification. For example, if a transport route has been identified as a road and the identified objects are train sets, then the previously identified road can be re-identified as a railway. For example, an object image library can be used for comparison with the identified object to determine whether the identified object for example is a road object, a railway object or a marine object. The object image library may contain images of objects usually present on roads, images of railway objects and images of marine objects.

Figure 2:
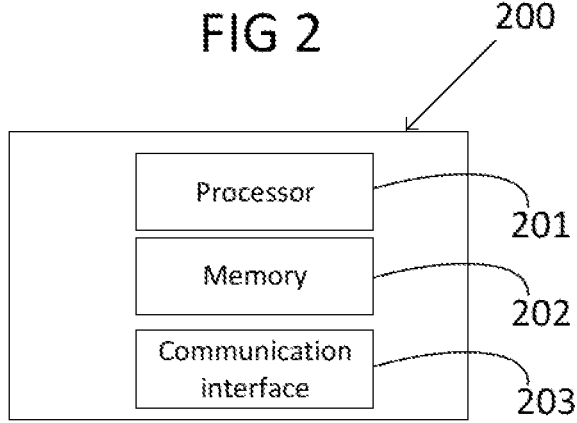
FIG. 2 is a block diagram illustrating an example of a tool for building a transport network map.

FIG. 2 illustrates a tool 200 for building a transport network map. The tool 200 comprises a processor 201 and at least one memory 202. The processor 201 is arranged to execute program instructions to execute the computer-implemented method as disclosed herein in relation to FIG. 1.

The at least one memory 202 may store the program instructions. The at least one memory may a satellite image library storing satellite images. The plurality of satellite images are preferably geo-referenced. This means that the obtained images are each associated to coordinate data in a common coordinate system, wherein 2D positions on the ground are given as latitude and longitude or equivalents thereof. The coordinate data may be two-dimensional or three-dimensional. Alternatively, the images are associated to a three-dimensional coordinate and a pointing direction of the imaging device at capture of the respective image.

The images, which cover the same transport network part may be co-registered. The at least one memory 202 may store roads or railways or water-based transport routes identified as disclosed herein along with determined characteristics for each identified road or railway or water-based transport route of one or a plurality of transport network parts. The identified roads or railways or water-based transport routes may for example be defined by geo-referenced coordinates as provided from the images.

The tool 200 for building a transport network map may further comprise a communication interface 203. The tool 200 may receive images via the communication interface 203. The received images may be stored in the image library or processed upon reception. The images may be co-registered at reception or be co-registered after reception before performing the computer-implemented method for attribution of LULC.

Further, the tool 200 may transmit via the communication interface information relating to roads or railways or water-based transport routes identified as disclosed herein along with determined characteristics for each identified road or railway or water-based transport route of one or a plurality of transport network parts. The identified roads or railways or water-based transport routes may for example be defined by geo-referenced coordinates as provided from the images.

Figure 3:
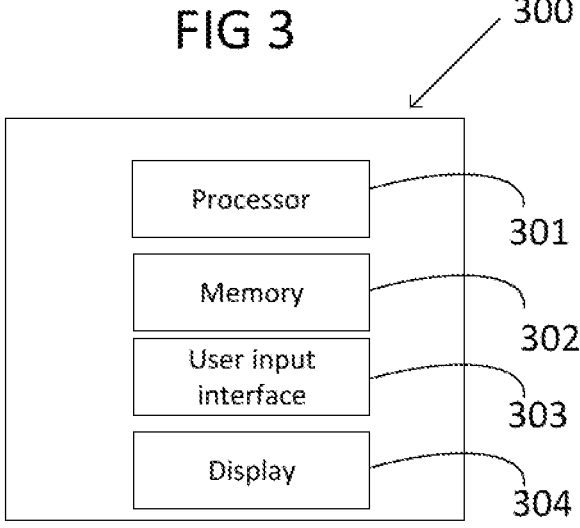
FIG. 3 is a block diagram illustrating an example of a navigation device.

FIG. 3 shows a navigation device 300 comprising a memory storing a transport network map at least partly provided using the method for attributing of Land Use/Land Cover as disclosed herein.

The navigation device 300 comprises at least one memory 302. The memory 302 stores coordinate information about transport routes identified as disclosed herein along with determined characteristics for each identified transport route of a transport network comprising a plurality if transport network parts. The identified transport routes may for example be defined by geo-referenced coordinates as provided from the images. This means that the obtained images are each associated to coordinate data in a common coordinate system, wherein 2D positions on the ground are given as latitude and longitude or equivalents thereof. The coordinate data may be two-dimensional or three-dimensional. Alternatively, the images are associated to a three-dimensional coordinate and a pointing direction of the imaging device at capture of the respective image.

The navigation device 300 comprises further a user input interface 303 such as a touch screen, keyboard, mouse or the like for user input of a destination.

The navigation device 300 comprises further a display 304 for presentation of route information for direction to said destination.

Characteristically, a processor 301 controls retrieval of data from the memory 302, processing of user input destination data to find at least one route to the destination and presentation of the route on the display 304. The processor 301 may be arranged to, when processing user input destination data to find at least one route to the destination take into account characteristics for each transport route determined as disclosed herein. The processor 301 may further be arranged to find at least two route options and to present using the display 304 the suggested options along with distance information and/or estimated time of arrival. Instead, or in addition thereto, the processor may further be arranged to control presentation using the display 304 of characteristics for the transport routes, said characteristics being determined as disclosed herein, connected to the respective route option. The user may then by means of the user input interface 303 select one of the at least two route options.

Figure 4:
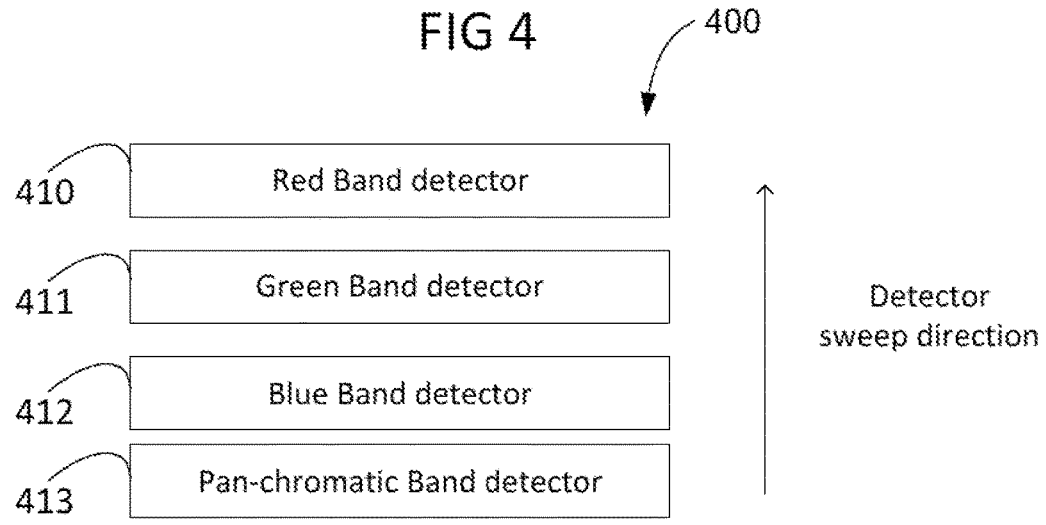
FIG. 4 is a schematic illustration of an exemplary image capture device comprising at least one first sensor and at least one second sensor.

In FIG. 4, an image capture device 400 is schematically disclosed comprising at least one first detector and a second detector. The at least one first detector may have a first wavelength characteristic and at least one second detector may have a second wavelength characteristic, said second wavelength characteristic being different than the first wavelength characteristic. In the illustrated example. The image capture device 400 comprises in the illustrated example a red band detector 410, a green band detector 411, a blue band detector 412, and a pan-chromatic detector 413. In these examples, the detectors are arranged to detect visible light. However, these are only examples. The image capture device may comprise at least two detectors selected from the above group of detectors. Alternatively, the image capture device may comprise at least one first detector from the group above and at least one second detector for detection another other wavelength characteristics. Or alternatively, the image capture device 400 may comprise detectors for detection of at least two wavelength characteristics not exemplified above. Note that the image capture device may comprise only pan-chromatic detectors.

There is a time difference between capture using the at least one first detector and the at least one second detector. Accordingly, when using this type of image capturing device 400, there is a time difference between capture using the first and second detectors. The effect of this is substantially none when objects in the image are stationary. However, when the objects captured by the image capturing device are in movement, this will be apparent from the image as the objects in movement captured by the first and second detectors will be displayed in slightly displaced locations in the image.

In the illustrated example, a detector sweep direction is illustrated upwards in the figure. Accordingly, first the pan-chromatic band detector 413 preforms detection, and thereafter the blue band detector 412, the green band detector 411 and the red band detector 410 in said order. It is not of importance in which order the different bands are detected, but is of importance to know the order to detection. Knowledge of the sweep direction enables identification of direction of movement of an object in the image. For example, knowledge that the blue band detector detects before the red band detector is knowledge that blue colour band of a moving object in an image is detected before red colour band of the moving object. Further, from knowledge of the sweep speed, i.e. the time difference as discussed above, and a determined size of the extension of the respective wavelength band in the moving direction, a velocity of the moving object can be calculated.

Figure 5:
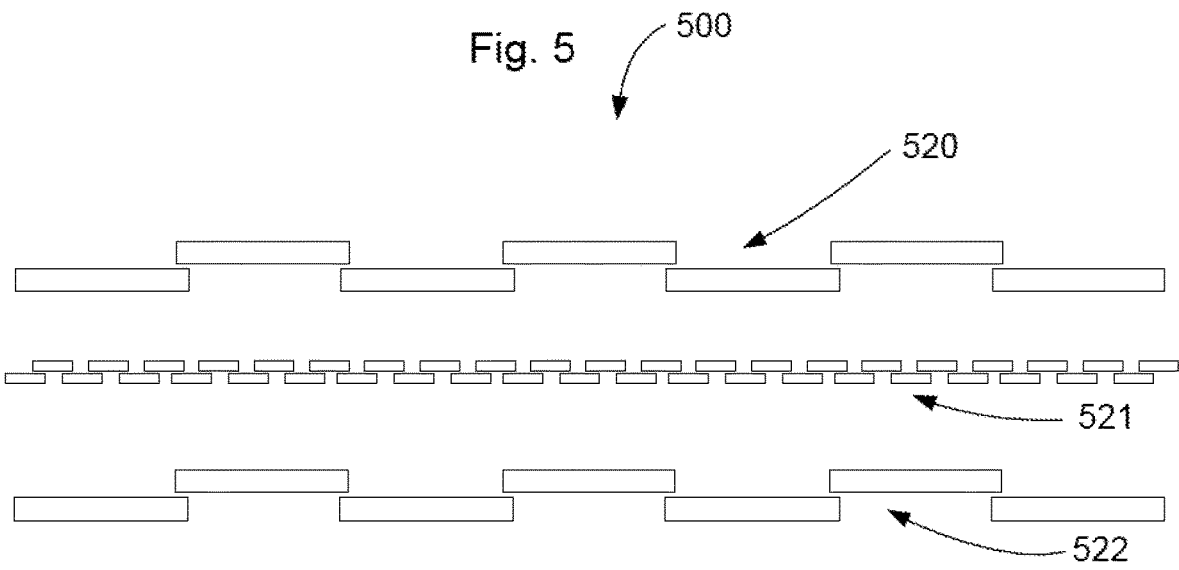
FIG. 5 is a schematic illustration of an alternative exemplary image capture device comprising at least one first sensor and at least one second sensor.

In FIG. 5, another example of a schematic view of an image capture device 500 on a satellite is shown. The sensor arrangement comprises of three sensor rows 520, 521 and 522. The upper sensor row 520 comprises for example multispectral sensors, the middle sensor row 521 comprises for example panchromatic sensors, and the lower sensor row 522 comprises for example multispectral sensors.

In FIG. 6, a first example of a section 600 of a transport network part is illustrated. In the illustrated example a first 630 transport route has been identified. In the following it is assumed that the first transport route is a road. Further, a second 631 transport route has been identified. Further, there is a crossing point 632 between the first road 630 and the second transport route 631.

For the first road 630, object velocities v 1 have been determined at different locations along the first road 630. In the illustrated example, the object velocities are substantially the same along the first road 630. Thereby, it can be assumed that the first road is not intersecting any other road or railway or water-based transport route or at least has not duty to give way. For the second transport route 631, object velocities v 2 have also been determined. The velocities of the second road/railway/water based route 631 are also substantially the same along the extension of the second transport route 631. This is an indication that the second transport route is not intersecting any other transport route or at least that there is no duty to give way. The fact that the second transport route 631 is obscured by the first road 630 further indicates that the first road 630 is above the second transport route 631 at the crossing point 632. The determined first and second velocities may be different or similar.

Thus, it can from processing of images be determined the following characteristics for the first road 630 and the second transport route 631.

A probable speed limit of the first road 630 can be determined from the determined velocity $v_1$.

A probable speed limit of the second road/railway/eater-based transport route 631 can be determined from the determined velocity $v_2$.

That the crossing point 632 is a viaduct.

In FIG. 7, a second example of a section 700 of a transport network part is illustrated. In the illustrated example a first 730 transport route has been identified. In the following it is assumed that the first transport route 730 is a road. Further, a second 731 transport route has been identified. In the following it is assumed that the second transport route 731 is a road. Further, there is a crossing point 732 between the first road 730 and the second road 731.

For the first road, object velocities v 1 as determined in the example of FIG. 6 have been determined at different locations along the road 730 at a distance from the crossing point 732. However, close to the crossing point 732, lower object velocities v 3 have been determined. Thereby, it can be assumed that the first road 730 is intersecting the second road 731 and has the duty to give way. For the second road 731, object velocities v 2 have also been determined. The velocities of the second road 731 are also substantially the same along the extension of the second road 731. This is an indication that the second road 731 is either not intersecting any other route or at least that there is no duty to give way.

Thus, it can from processing of images be determined at least the following characteristics for the first road 630 and the second road/railway/water-based transport route 731.

A probable speed limit of the first road 730 can be determined from the determined velocity $v_1$.

A probable speed limit of the second road 731 can be determined from the determined velocity $v_2$.

That the crossing point 732 is an intersection where the first road has duty to give way.

The same reasoning above applies if for instance the second road is instead a railway. The crossing point may then be determined as a level crossing.

In FIG. 8, a third example of a section 800 of a transport network part is illustrated. In the illustrated example a first 830*a* transport route has been identified. In the following it is assumed that the first transport route is a road. Further, a potentially second transport route 830*b* has been identified. In the following it is assumed that the potentially second transport route is a road.

Object velocities $v_1$ have been determined at different locations along both the first road 830*a* and the potentially second road 830*b*. It has been determined that the object velocities $v_1$ are essentially the same at the first road 830*a* and the potentially second road 830*b*. Further, there may be no indication of any changes in velocity the first road 830*a* and the potentially second road 830*b*. Further, the first and potentially second roads both end without any hint of a continuation.

Thus, it can from processing of images be determined at least the following characteristics for the first road 830*a* and the potentially second road 830*b*.

The first road 830*a* and the potential second road 830*b* are the same road.

A probable speed limit of the road 830*a*, 830*b* can be determined from the determined velocity $v_1$.

The road 830*a*, 830*b* has a hidden section 833.

The hidden section is a tunnel or at least one object in the satellite images is obscuring the road in this section.

In FIG. 9, a fourth example of a section 900 of a transport network part is illustrated. There are many roads and there is an intersection area 932 in which it is not possible to draw the conclusion from visual inspection of satellite images how the roads are connected. The principles disclosed herein can then be used to resolve the problem of finding road-parts which are connected.

The various aspects, embodiments, implementations or features of the described embodiments can be used separately or in any combination. Various aspects of the described embodiments can be implemented by software, hardware or a combination of hardware and software. The methods and operations may be implemented in some embodiments in a computer readable medium, which is any data storage device that can store data which can thereafter be read by a computer system. Examples of the computer readable medium include read-only memory, random-access memory, CD-ROMs, DVDs, magnetic tape and optical data storage devices. The computer readable medium can also be distributed over network-coupled computer systems so that the computer readable code is stored and executed in a distributed fashion.

The person skilled in the art realizes that the present disclosure is not limited to the examples described above. The person skilled in the art further realizes that modifications and variations are possible within the scope of the appended claims. Additionally, variations to the disclosed examples can be understood and effected by the skilled person in practicing the claimed disclosure, from a study of the drawings, the disclosure, and the appended claims.

What is claimed is:

1. A method comprising:

providing a plurality of co-registered images comprising at least one satellite image, the co-registered images covering a transport network part;

identifying multiple moving objects in at least a subset of the plurality of images;

determining, by a computing device, velocities of the multiple identified moving objects, from the plurality of co-registered images;

identifying, by the computing device, a transport route routes at least in the at least one satellite image of the plurality of images, the transport route including the transport network part; and determining, by the computing device, one or more characteristics of the transport network part based on the velocities of the multiple identified moving objects along the identified transport route, wherein the one or more characteristics include: i) a speed limit for the transport network part, ii) whether there is a duty to give way at the transport network part, and/or iii) whether the transport network part includes a tunnel or a viaduct.

2. The method of claim 1, wherein determining the one or more characteristics of the transport network part further comprises determining a number of parallel lanes or tracks in the identified transport route based on locations of multiple moving objects on the transport route in a direction across the extension of the transport route.

3. The method of claim 1, wherein at least some of the images used for identification of multiple moving objects are obtained using at least one first sensor and at least one second sensor, wherein there is a time difference between capture using the at least one first sensor and the at least one second sensor.

4. The method of claim 3, wherein identifying the multiple moving objects is based on the time difference and displacements of the multiple moving objects in the image originating from capture using the at least one first sensor and capture using the at least one second sensor.

5. The method of claim 4, further comprising determining an orientation of one or more of the multiple moving objects based on the detected displacements; and wherein the characteristics of the transport network part is determined based on the determined orientation of the moving objects.

6. The method of claim 5, wherein determining the velocities of the multiple moving objects is based on the time difference and displacements of the multiple moving objects in the image originating from capture using the at least one first sensor and capture using the at least one second sensor.

7. The method of claim 1, wherein determining the one or more characteristics of the transport network part is based on the velocities of the multiple moving objects at different portions of the plurality of images.

8. The method of claim 1, wherein at least a part of the obtained images are geo-referenced.

9. The method of claim 1, wherein the multiple moving objects are vehicles, which include land-based vehicles or marine vehicles.

10. The method of claim 1, wherein the transport network part includes a level crossing; and wherein determining the one or more characteristics includes determining there is a duty to give way for the transport route at the level crossing.

11. A system comprising:

a memory storage; and a processing unit coupled to the memory storage, wherein the processing unit is operative to:

provide a plurality of co-registered images comprising at least one satellite image, the co-registered images covering a transport network part, identify multiple moving objects in at least a subset of the plurality of images, determine velocities of the multiple identified moving objects, from the plurality of co-registered images;

identify a transport route at least in the at least one satellite image of the plurality of images, the transport route including the transport network part; and determine characteristics of the transport network part based on the velocities of the multiple identified moving objects along the identified transport route, wherein the one or more characteristics include i) a speed limit for the transport network part, ii) whether there is a duty to give way at the transport network part, and/or iii) whether the transport network part includes a tunnel or a viaduct.

12. A non-transitory computer-readable medium that stores a set of instructions which when executed perform a method executed by the set of instructions comprising:

providing a plurality of co-registered images comprising at least one satellite image, the co-registered images covering a transport network part;

identifying multiple moving objects in at least a subset of the plurality of images;

determine velocities of the multiple identified moving objects, from the plurality of co-registered images;

identifying a transport route at least in the at least one satellite image of the plurality of images, the transport route including the transport network part; and determining one or more characteristics of the transport network part based on the velocities of the multiple identified moving objects along the identified transport route, wherein the one or more characteristics include i) a speed limit for the transport network part, ii) whether there is a duty to give way at the transport network part, and/or iii) whether the transport network part includes a tunnel or a viaduct.

* * * * *